US010286831B2

(12) United States Patent
Gutierrez Lopez de Lara et al.

(10) Patent No.: US 10,286,831 B2
(45) Date of Patent: May 14, 2019

(54) CARGO MANAGEMENT SYSTEM INCORPORATING A MAT OF MEMORY FOAM

(71) Applicant: FORD GLOBAL TECHNOLOGIES, LLC, Dearborn, MI (US)

(72) Inventors: Armando Enrique Gutierrez Lopez de Lara, Mexico City (MX); Guillermo Cesar Cervantes Guarneros, Atizapan de Zaragoza (MX); Carlos Ernesto Saenz Camacho, Calimaya (MX)

(73) Assignee: Ford Global Technologies, LLC, Dearborn, MI (US)

(*) Notice: Subject to any disclaimer, the term of this patent is extended or adjusted under 35 U.S.C. 154(b) by 164 days.

(21) Appl. No.: 15/158,020

(22) Filed: May 18, 2016

(65) Prior Publication Data
US 2017/0334334 A1 Nov. 23, 2017

(51) Int. Cl.
*B60P 7/08* (2006.01)
(52) U.S. Cl.
CPC .................. *B60P 7/0892* (2013.01)
(58) Field of Classification Search
CPC ........... B60P 7/0892; B60P 7/135; B60R 5/04
USPC ....... 410/30, 49, 50, 87, 88, 94, 95, 46, 117, 410/118, 121, 155; 206/523, 524, 206/591–594; 224/318, 501, 552; 5/118, 5/420, 694, 729, 736, 657, 659
See application file for complete search history.

(56) References Cited

U.S. PATENT DOCUMENTS

| 6,702,532 B1 | 3/2004 | Throener | |
| 7,244,084 B2 * | 7/2007 | Anthony | B60P 7/12 410/36 |
| 7,478,858 B1 | 1/2009 | Brun | |
| 7,972,098 B2 * | 7/2011 | DeMent | B60P 7/0892 410/117 |
| 8,281,923 B2 * | 10/2012 | Elenes | B65D 25/287 206/316.2 |

FOREIGN PATENT DOCUMENTS

| CN | 201736864 U | 2/2011 |
| CN | 204037477 U | 12/2014 |
| CN | 204383346 U | 6/2015 |
| CN | 204623244 U | 9/2015 |
| FR | 2896740 A1 | 8/2007 |

OTHER PUBLICATIONS

English Machine Translation of CN201736864U.
English Machine Translation of CN204037477U.
English Machine Translation of CN204383346U.
English Machine Translation of CN204623244U.
English Machine Translation of FR2896740A1.

* cited by examiner

*Primary Examiner* — Stephen T Gordon
(74) *Attorney, Agent, or Firm* — Vichit Chea; King & Schickli, PLLC

(57) ABSTRACT

A cargo management system is provided. That cargo management system includes a mat of memory foam and at least one adjustable stop positioned below the mat and forming a raised hump in the mat to help retain cargo from shifting or rolling during motor vehicle operation. A method of managing cargo in a motor vehicle is also disclosed.

12 Claims, 5 Drawing Sheets

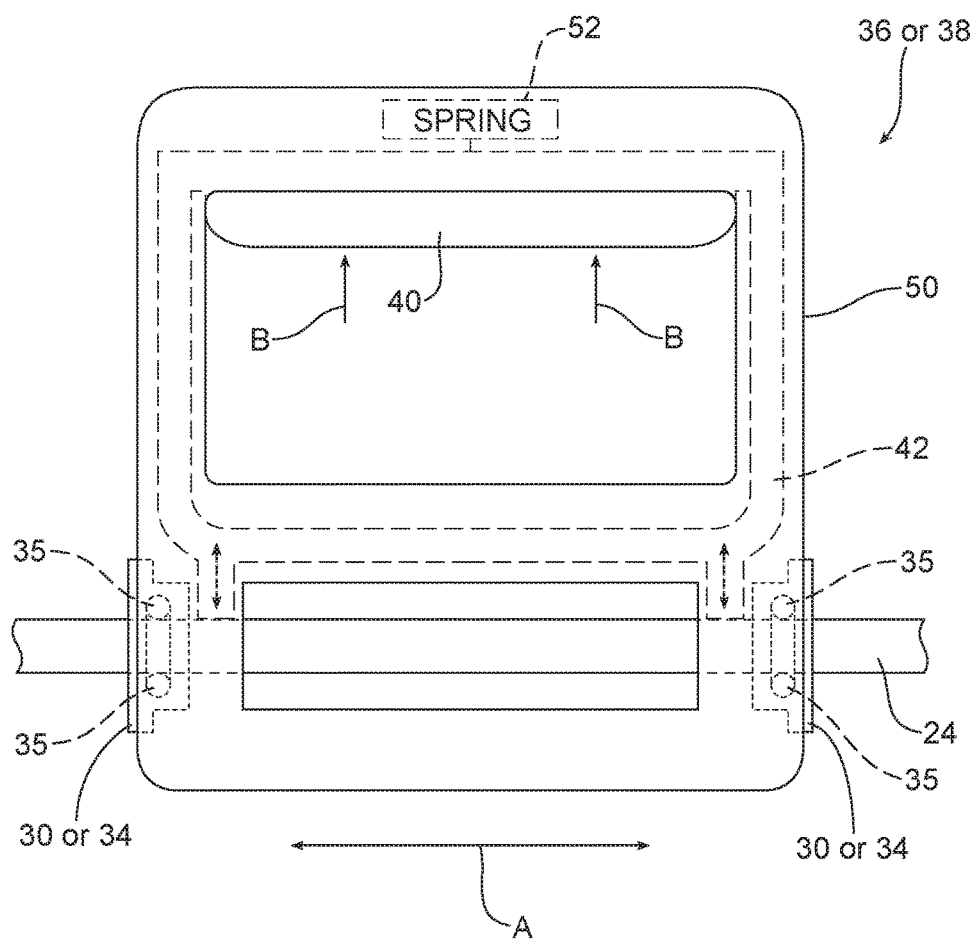

CARGO MANAGEMENT SYSTEM INCORPORATING A MAT OF MEMORY FOAM

TECHNICAL FIELD

This document relates generally to the motor vehicle equipment field and, more particularly, to a cargo management system incorporating a mat of memory foam and one or more adjustable stops in order to prevent an object from shifting or rolling around in the storage area of a motor vehicle while that motor vehicle is in operation.

BACKGROUND

When transporting cargo in a motor vehicle, it is not unusual for that cargo to shift or roll when subjected to the forces generated when a motor vehicle is cornering, braking or accelerating. At a minimum, such shifting and rolling of cargo is an unwanted driver distraction. In some instances, it may even lead to damaging of the cargo and/or the motor vehicle.

This document relates to a new and improved cargo management system and related method for managing cargo in a motor vehicle. Advantageously, the system incorporates a mat of memory foam in conjunction with one or more adjustable stops which make the cargo management system customizable to support substantially any cargo and positively maintain that cargo in position even during spirited driving of the motor vehicle.

SUMMARY

This document relates to a new and improved cargo management system. That cargo management system comprises a mat of memory foam and a first adjustable stop positioned below the mat and forming a raised hump in the mat. The cargo management system may further include a guide track wherein the first adjustable stop is displaceable along the guide track. Still further, the cargo management system may include a first brake mechanism securing the first adjustable stop in a first selected position along the guide track underneath the mat.

That guide track may include a first guide rail and a second guide rail. The first adjustable stop may span the first and second guide rails. Further, the first adjustable stop may include a first follower in engagement with the first guide track and a second follower in engagement with the second guide track.

The first brake mechanism may include an actuator and a friction brake element.

In some embodiments, the cargo management system may further include a second adjustable stop positioned below the mat and forming a second raised hump in the mat. Further, the cargo management system may include a second brake mechanism securing the second adjustable stop in a second selected position along the guide track beneath the mat. The second adjustable stop may span the first guide rail and the second guide rail just like the first adjustable stop.

A scrim layer may be provided between (a) the mat of memory foam and (b) the first and second adjustable stops. Further, the cargo management system may include a base. The first and second guide rails may be secured to the base and the first and the second adjustable stops may be positioned between the base and the scrim layer.

In accordance with an additional aspect, a method is provided of managing cargo in a motor vehicle. That method may be described as broadly comprising the steps of: (a) positioning cargo onto a mat of memory foam, (b) providing a first stop under the memory foam at one side of the cargo and (c) providing a second stop under the memory foam at a second side of the cargo whereby the cargo is held between the two stops.

Still further, the method may include the steps of sliding the first adjustable stop along a guide track and sliding the second adjustable stop along the guide track. Further, the method may include securing the two adjustable stops in a desired position along the guide track by means of friction brakes.

In the following description, there are shown and described several preferred embodiments of the cargo management system and related method of managing cargo in a motor vehicle. As it should be realized, the cargo management system is capable of other, different embodiments and its several details are capable of modification in various, obvious aspects all without departing from the cargo management system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cargo management system and the related method of managing cargo in a motor vehicle and together with the description serve to explain certain principles thereof. In the drawing figures:

FIG. 5 is a detailed view of a brake mechanism for maintaining an adjustable stop at a selected position along the guide rails.

Reference will now be made in detail to the present preferred embodiments of the cargo management system and related method, examples of which are illustrated in the accompanying drawing figures.

DETAILED DESCRIPTION

Figure 1:
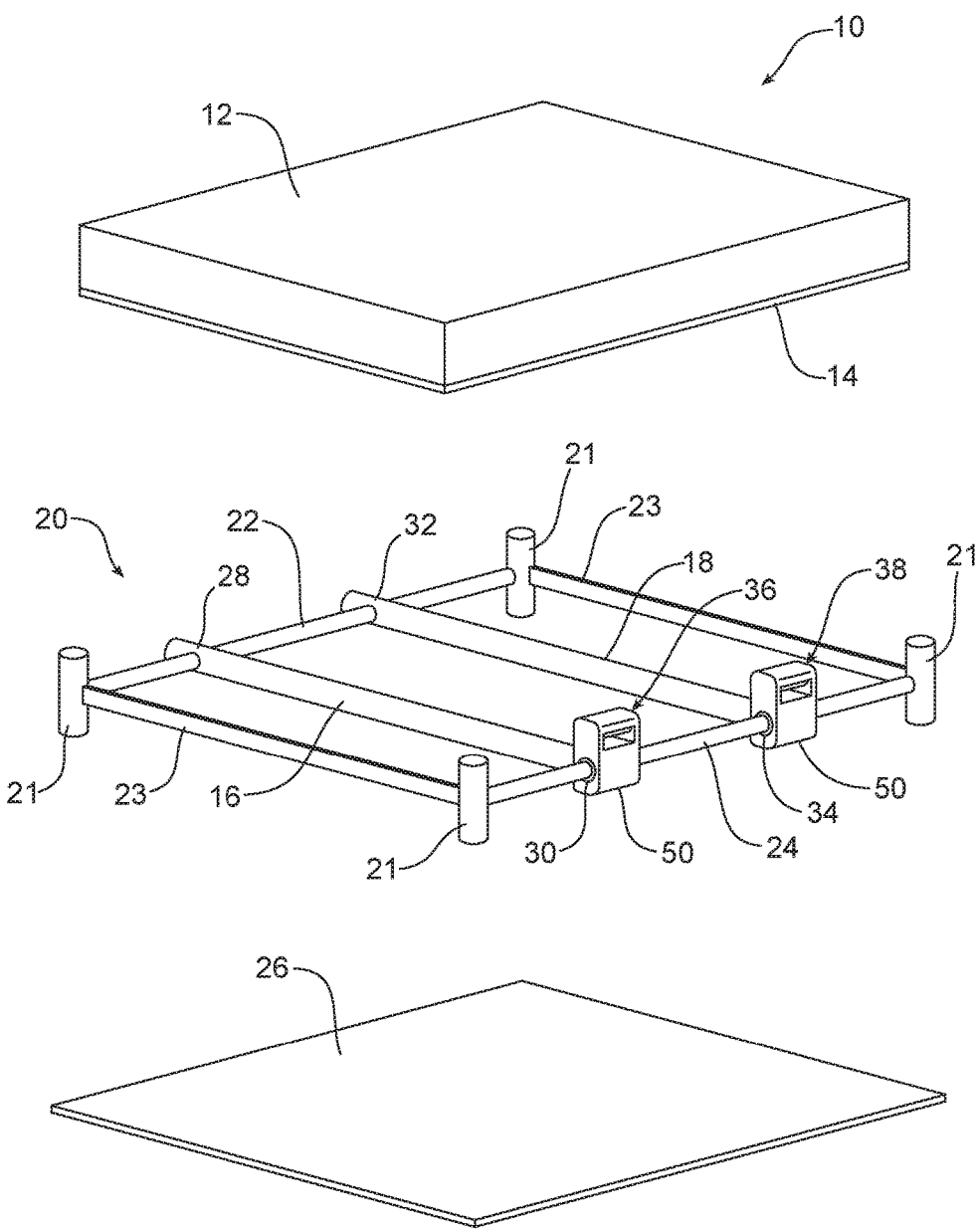
FIG. 1 is an exploded perspective view of the cargo management system.

Reference is now made to FIG. 1-5 illustrating the new and improved cargo management system 10. As best illustrated in FIG. 1, that cargo management system 10 includes a mat 12 that is preferably made from a visco elastic polyurethane foam also known as memory foam. A scrim layer 14 is provided along the bottom face of the mat 12.

The cargo management system 10 illustrated in FIG. 1 includes a first adjustable stop 16 and a second adjustable stop 18. While the illustrated embodiment of the cargo management system 10 includes two adjustable stops 16, 18, it should be appreciated that the cargo management system may include as few as one adjustable stop or as many as four or more adjustable stops. In the illustrated embodiment, the two adjustable stops 16, 18 are both elongated rods.

As further illustrated in FIG. 1, the cargo management system 10 also includes a guide track generally designated by reference numeral 20. In the illustrated embodiment, the guide track 20 includes four corner posts 21, two cross members 23, a first guide rail 22 and a second guide rail 24. As still further illustrated in FIG. 1, the cargo management system 10 also includes a support or base 26 to which the guide track 20 may be secured by fasteners (not shown).

The first adjustable stop 16 includes a first follower 28 at one end and a second follower 30 at the other end. The first follower 28 engages and slides along the first guide rail 22 while the second follower 30 engages and slides along the second guide rail 24. Thus, it should be appreciated that the first adjustable stop 16 spans between the first and second guide rails 22, 24.

Similarly, the second adjustable stop 18 includes a third follower 32 at one end and a fourth follower 34 at the other end. The third follower 32 engages and slides along the first guide track 22 while the fourth follower engages and slides along the second guide track 24. Thus, it should be appreciated that the second adjustable stop 18, like the first adjustable stop 16, spans between the first and second guide rails 22, 24. Further, each adjustable stop 16, 18 is displaceable along the guide rails 22, 24 of the guide track 20. More specifically, each follower 28, 30, 32, 34 may be provided with opposed roller bearings 35 to provide for smooth sliding motion of the stops 16, 18 along the guide rails 22,24 (See FIG. 5).

A first brake mechanism, generally designated by reference numeral 36 secures the first adjustable stop 16 in a first selected position along the guide track 20. A similar, second brake mechanism 38 secures the second adjustable stop 18 in a second selected position along the guide track 20.

As best illustrated in FIG. 5, the first brake mechanism 36 includes an actuator 40 and an integral friction brake element 42. The actuator 40 is provided within the control handle 50 that forms a part of the first follower 28 on the stop 16 and the third follower 32 on the stop 18.

Figure 2:
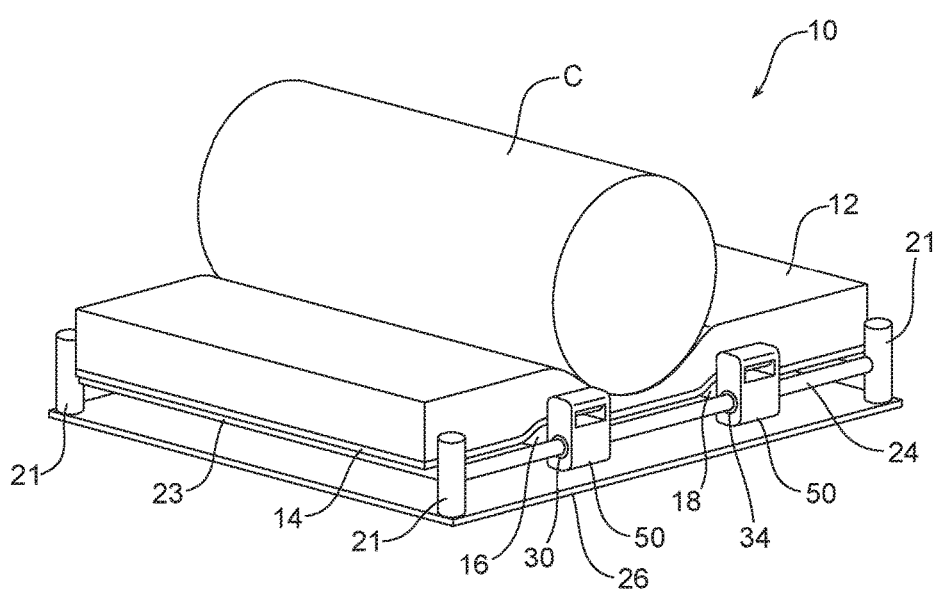
FIG. 2 is a perspective view of the cargo management system of FIG. 1 in an assembled condition.
Figure 3:
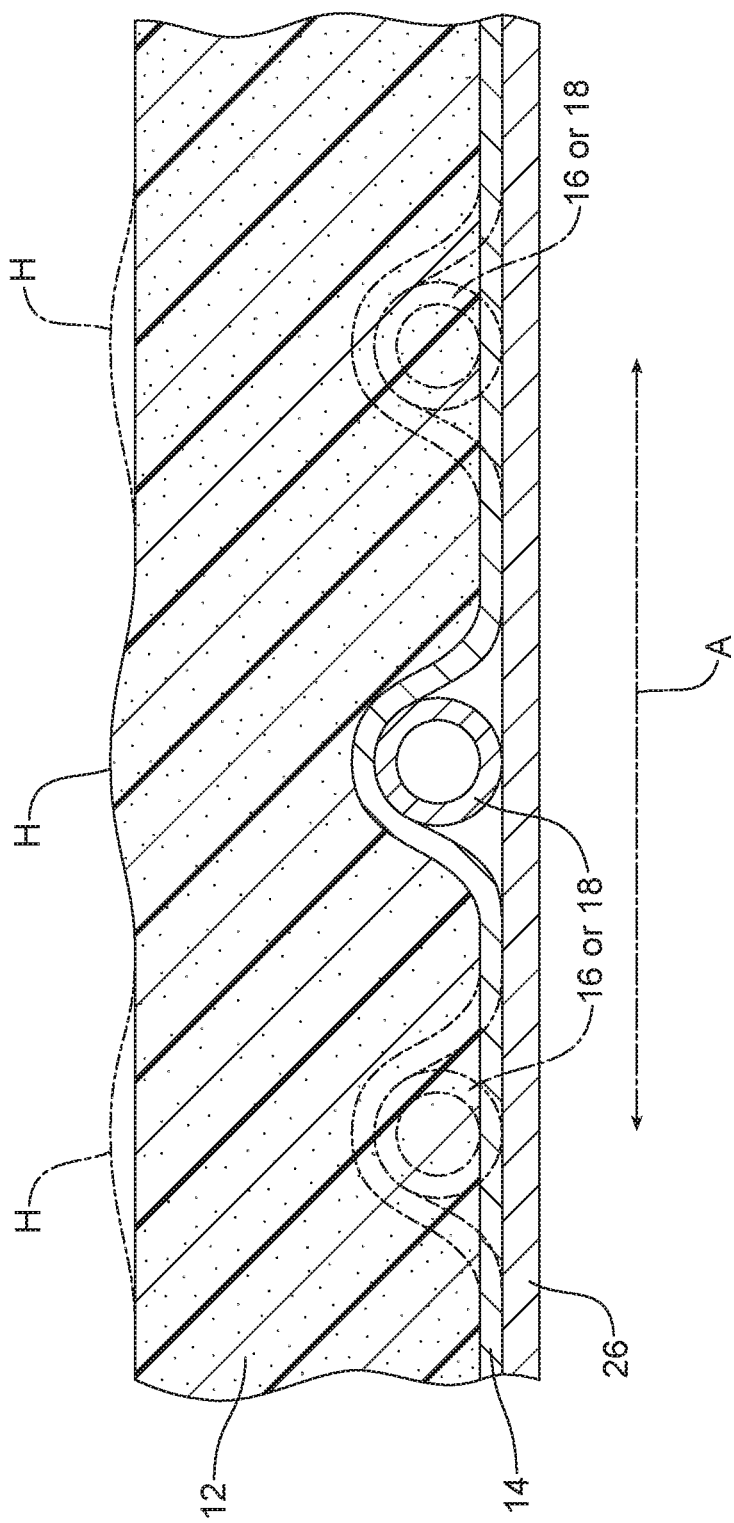
FIG. 3 is a sectional view of the assembled cargo management system showing how an adjustable stop may be moved along a guide rail in order to provide a hump at a desired location in the mat memory foam.
Figure 4:
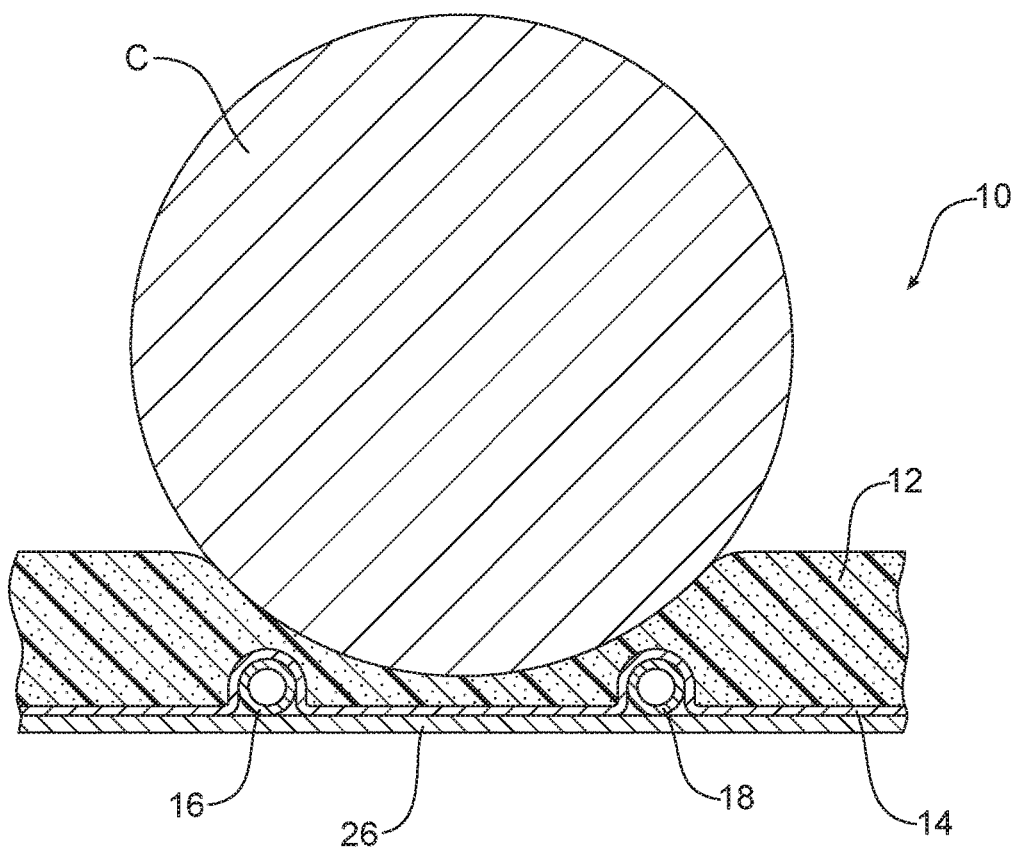
FIG. 4 is a sectional view illustrating how an object of cargo may be captured between two adjustable stops adjacent each side of the cargo object.

As best illustrated in FIG. 2, either of the adjustable stops 16, 18 may be displaced along the guide rails 22, 24 of the guide track 20 to form a raised hump in the overlying mat 12. As illustrated in FIG. 3, that hump may be moved to the left or right (note action arrow A) depending upon the positioning of the adjustable stop 16 or 18. Thus, as illustrated in FIGS. 2 and 4, it should be appreciated that an object of cargo C may be supported on the mat 12 in a manner that resists and in most cases prevents the shifting or rolling of the cargo during cornering, braking and accelerating of the motor vehicle.

More specifically, the cargo management system 10 may be utilized in a method of managing cargo C in a motor vehicle. That method may be broadly described as including the step of positioning the cargo C onto the upper surface of the mat 12 of memory foam. Next the method includes the steps of providing a first stop 16 in the memory foam at one side of the cargo C and providing a second stop 18 in the memory foam at a second side of the cargo C whereby the cargo is held in position between the first and second stops.

In the illustrated embodiment, the method includes providing the first adjustable stop 16 below the mat 12 adjacent the first side of the cargo C. Further, the method includes providing the second adjustable stop 18 below the mat 12 adjacent the second side of the cargo C. As noted above, this includes sliding the first and second adjustable stops 16, 18 along the guide rails 22, 24 of the guide track 20.

More specifically, the first adjustable stop 16 is displaced along the guide track 20 by first engaging and squeezing the actuator 40 of the first brake mechanism 36 (note action arrows B in FIG. 5), thereby releasing the friction brake element 42 from the guide rail 22 to thereby allow the sliding of the adjustable stop along the guide track 20. Ease of movement is insured by the roller bearings 35. Once the first adjustable stop 16 has been moved to the desired position, the actuator 40 is released and the friction brake element 42 is reengaged with the first guide rail 22 so that the stop 16 is held in the desired position.

Similarly, when one wishes to displace the second adjustable stop 18 along the guide track 20, one engages the actuator 40 of the second brake mechanism 38 to release the friction brake element 42 from the guide rail 22 and allow the displacement of the adjustable stop along the guide track 20. Once the second adjustable stop 18 has been positioned where desired, the actuator 40 is released to reengage the friction brake element 42 with the guide rail 22 and hold the second adjustable stop 18 in the desired position on the second side of the cargo. Here, it should be appreciated that each brake mechanism 36, 38 includes a spring 52 which biases the friction brake element 42 into engagement with the guide rail 22 when the actuator 40 is released. It should also be noted that the scrim 14 protects the memory foam 12 from being eroded or damaged when the stops 16, 18 are displaced between positions.

As should be appreciated, the memory foam mat 12 compresses around the cargo C forming a cavity of complementary shape that tends to hold the cargo C in positioned. The underlying stops 16, 18 on the two sides of the cargo C aid to further resist any shifting of the cargo to either side thereby functioning to prevent shifting and rolling of the cargo in a desired manner.

The cargo management system 10 may be incorporated into any cargo area of substantially any type of motor vehicle including, but not necessarily limited to, the trunk of a sedan, the storage area under a hatchback, the storage area behind the rearmost seats in a sports utility vehicle and the storage area behind the rearmost seats in a crossover utility vehicle. Thus, it should be appreciated that the cargo management system 10 and particularly, the base 26 as well as the guide rails 22, 24 and the adjustable stops 16, 18 may be sized and shaped to fit any of these areas. Further, while the illustrated embodiment incorporates a base 26 it should be appreciated that in certain applications the guide rails 22, 24 of the guide track 20 may be mounted directly to the floor of the motor vehicle if desired with the separate base being eliminated.

The foregoing has been presented for purposes of illustration and description. It is not intended to be exhaustive or to limit the embodiments to the precise form disclosed. Obvious modifications and variations are possible in light of the above teachings. For example, one stop 16 could be used to capture cargo between that stop and one sidewall of the cargo area of the motor vehicle. The other stop 18 could then be used to capture other cargo between it and the opposite sidewall of the cargo area if desired. All such modifications and variations are within the scope of the appended claims when interpreted in accordance with the breadth to which they are fairly, legally and equitably entitled.

What is claimed:

1. A cargo management system, comprising:
   a memory foam mat;
   a first adjustable stop positioned below said memory foam mat and forming a first raised hump in said memory foam mat;

a second adjustable stop positioned below said memory foam mat and forming a second raised hump in said memory foam mat; and a scrim layer between said memory foam mat and said first and second adjustable stops.

2. The cargo management system of claim 1, further including a guide track wherein said first adjustable stop is displaceable along said guide track.

3. The cargo management system of claim 2, further including a first brake mechanism securing said first adjustable stop in a first selected position along said guide track.

4. The cargo management system of claim 3, wherein said guide track includes a first guide rail and a second guide rail.

5. The cargo management system of claim 4, wherein said first adjustable stop spans said first guide rail and said second guide rail.

6. The cargo management system of claim 5, wherein said first adjustable stop includes a first follower in engagement with said first guide rail and a second follower in engagement with said second guide rail.

7. The cargo management system of claim 6, wherein said first brake mechanism includes an actuator and a friction brake element.

8. A cargo management system, comprising:

a memory foam mat;

a guide track including a first guide rail and a second guide rail;

a first adjustable stop positioned below said memory foam mat and forming a raised hump in said memory foam mat, said first adjustable stop being displaceable along said guide track and spanning said first guide rail and said second guide rail, said first adjustable stop further including a first follower in engagement with said first guide rail and a second follower in engagement with said second guide rail; and a first brake mechanism securing said first adjustable stop in a first selected position along said guide track.

9. The cargo management system of claim, 7 further including a second brake mechanism securing said second adjustable stop in a second selected position along said guide track.

10. The cargo management system of claim 9, wherein said second adjustable stop spans said first guide rail and said second guide rail.

11. The cargo management system of claim 8, wherein said first brake mechanism includes an actuator and a friction brake element.

12. The cargo management system of claim 10, including a base wherein said first guide rail and said second guide rail are secured to said base and said first adjustable stop and said second adjustable stop are positioned between said base and said scrim layer.

* * * * *